United States Patent [19]
Sarich

[11] Patent Number: 5,367,950
[45] Date of Patent: Nov. 29, 1994

[54] VERTICAL HEAT SOURCE ROTISSERIE

[75] Inventor: Richard T. Sarich, West Allis, Wis.

[73] Assignee: RTS Enterprises, Inc., West Allis, Wis.

[21] Appl. No.: 182,238

[22] Filed: Jan. 18, 1994

[51] Int. Cl.[5] ............................................. A47J 37/04
[52] U.S. Cl. .................................. 99/421 H; 99/449
[58] Field of Search ........... 99/419, 421 H, 421 HH, 99/421 HV, 421 P, 449, 447; 126/9 R, 25 A, 41 B

[56] References Cited

U.S. PATENT DOCUMENTS

| | | | |
|---|---|---|---|
| 3,124,057 | 3/1964 | Kiser | 99/421 H |
| 3,319,562 | 5/1967 | Turcott et al. | 99/339 |
| 3,550,525 | 12/1970 | Rabello et al. | 99/421 AA |
| 3,742,838 | 7/1973 | Luschen et al. | 99/421 H |
| 4,403,595 | 9/1983 | Maesk | 126/25 A |
| 4,627,410 | 12/1986 | Jung | 126/41 B |

FOREIGN PATENT DOCUMENTS 2941398 4/1980 Germany ............................. 99/419

*Primary Examiner*—David A. Scherbel
*Assistant Examiner*—Reginald L. Alexander
*Attorney, Agent, or Firm*—Joseph S. Heino

[57] ABSTRACT

A rotisserie cooking unit has a centrally configured heat source, a pair of removable spit carriers and a pair of removable covers which are configured to provide the function of covering and enclosing the unit and of opening up to serve as drip pans and ash catches.

4 Claims, 2 Drawing Sheets

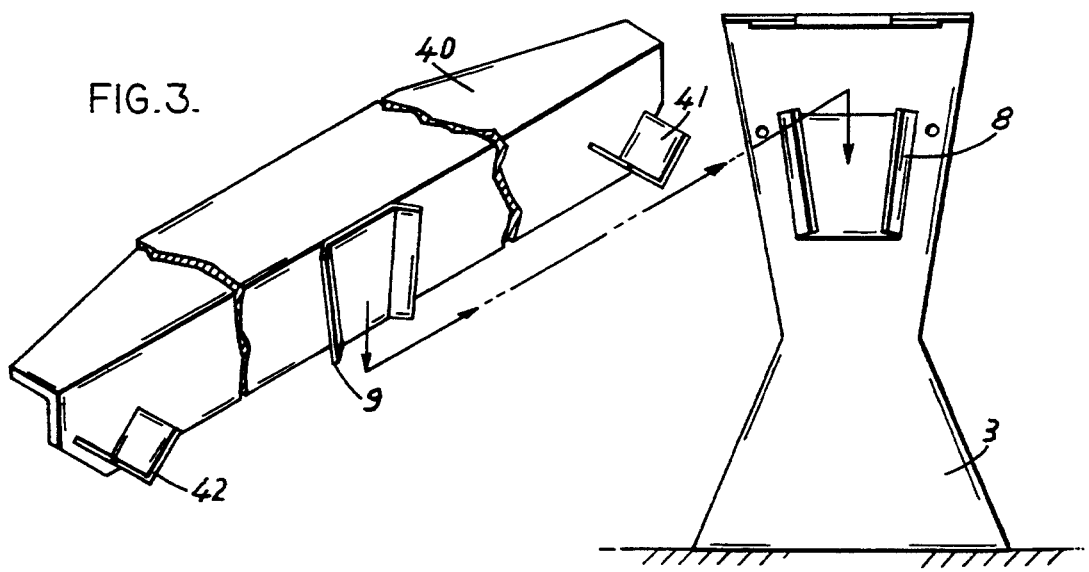
FIG. 3.
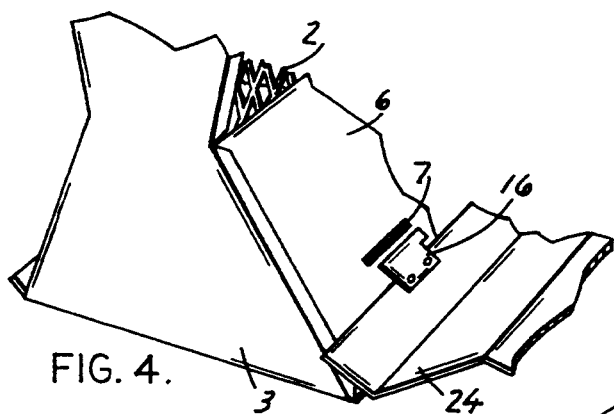
FIG. 4.
FIG. 5.
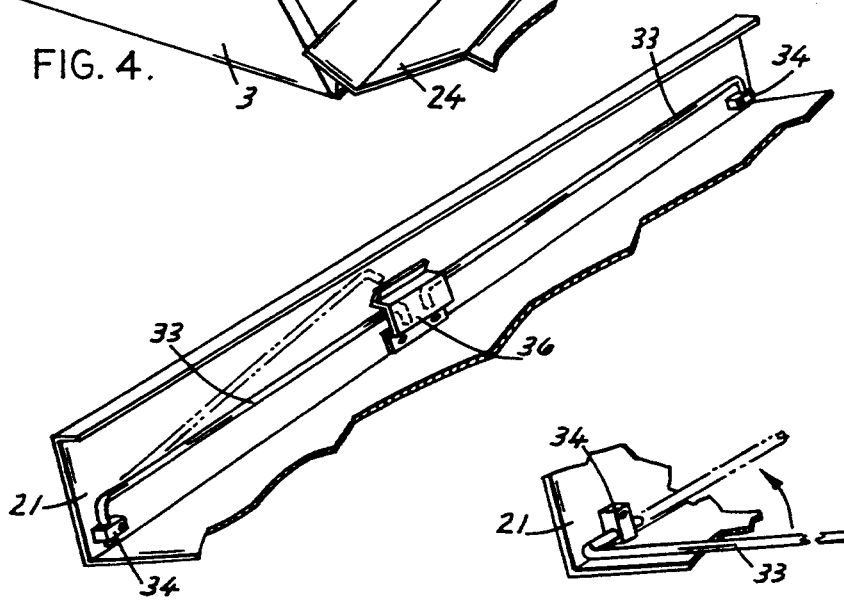
FIG. 6.

VERTICAL HEAT SOURCE ROTISSERIE

FIELD OF THE INVENTION

This invention relates generally to rotisserie cooking units. More particularly, it relates to portable rotisserie cooking units having a vertically-positioned heat source and rotatable spits.

BACKGROUND OF THE INVENTION

A commonly recognized problem associated with barbecue grills and the like is the need to provide a fairly uniform heat source for the food items to be grilled. That is, the heat source should be uniform as to temperature, as to cooking exposure time and as to distance from the food items to be grilled. The advent of the rotisserie cooking unit has helped in providing such uniformity in the cooking process. Accordingly, the use of rotisserie cooking units is well known. See, for example, U.S. Pat. Nos. 4,403,595 to Maesk and 3,319,562 to Turcott et al.

These rotisserie cooking units, however, typically utilize a non-detachable chain driven spit which can, in the experience of this inventor, prove dangerous to fingers and hands. Such a configuration tends to cause a "jerking" motion of the spit when the top heavy part of the meat which is being cooked on the spit comes over top center. This, in turn, can result in the meat becoming loosened on the spit. It may also result in a hesitation in the cooking cycle at the bottom center of the weight offset and burned, or undercooked, meat. It also can result in the stretching of the chain drive which affects overall longevity of the unit. Most importantly, the chain drive for the spits is a permanent configuration. These rotisserie units are also configured so as not to be very portable and certainly are not very compact when not in use.

SUMMARY OF THE INVENTION

It is, therefore, a principal object of this invention to provide a new, useful and uncomplicated rotisserie cooking unit having a vertical heat source and which requires only a minimal number of elements and which requires only a minimal number of steps to assemble and to disassemble the cooking unit in the field. It is another object of this invention to provide such a device which, once assembled, is easily utilized in the field to uniformly cook meat and which, because of its configuration, insures the uniform cooking of the meat and the like. It is still another object of this invention to provide such a device which is collapsible, which occupies a much smaller area when collapsed than when assembled and which results in the unit having a rather compact suitcase-like appearance when collapsed.

The present invention has obtained these objects. It provides for a rotisserie cooking unit having a centrally configured heat source to which is attached a pair of removable covers. The covers are configured so as to provide the dual function of covering and enclosing the unit when such is desired or required and of opening up to serve as drip pans and ash catches. The ends of the cooking unit utilize removable spit carriers between which are situated the parallel spit assemblies which are rotated in relation to the heat source by virtue of a motor box assembly which is part of one of the spit carriers. The removability of the covers and the spit carriers result in the entire unit being easily and readily assembled and disassembled in the field and, when transported in their disassembled state, allow the unit to assume a relatively unobtrusive and compact package. The foregoing and other features of the device of the present invention will be further apparent from the description which follows.

BRIEF DESCRIPTION OF THE DRAWINGS

FIG. 3 is an enlarged partial side elevational view of the coal crib assembly and a perspective view of the spit carrier end shown in FIG. 1.

FIG. 4 is an enlarged partial perspective view of the coal crib shown in FIG. 1 and showing the hinge tab details.

FIG. 5 is an enlarged partial perspective view of the detachable drip pan and the support rods shown in FIG. 1.

FIG. 6 is a further enlarged partial perspective view of the swivel mount for the support rods shown in FIG. 5.

DETAILED DESCRIPTION

Figure 2:
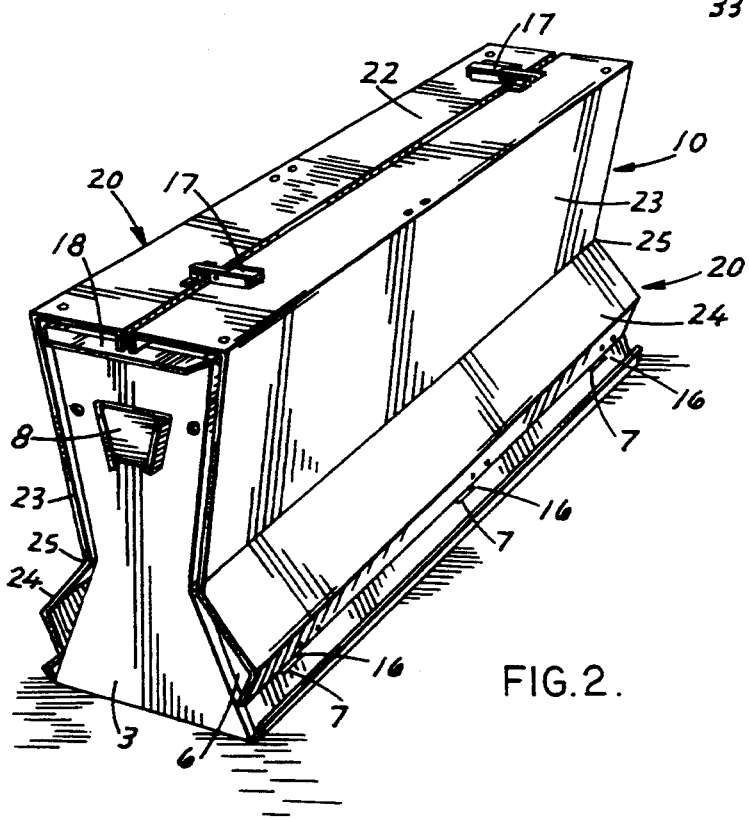
FIG. 2 is a perspective view of the unit shown in FIG. 1 showing the elements of the unit in their fully assembled state.

Referring now to the drawings in detail, FIG. 2 shows a rotisserie cooking unit constructed in accordance with the device of the present invention. While a coal crib assembly, generally identified 10, is utilized as the heat source in the illustrated embodiment of the present invention, it is to be understood that other types of heat source could be utilized.

The coal crib assembly 10 of this illustrated embodiment includes a pair of detachable crib covers, each of which is generally identified 20. The crib covers 20 have a top cover portion 22 to which is attached a pair of latches 17. In addition to the top cover portion 22, each of the detachable crib covers 20 also includes a drip pan portion 23 and an ash catch portion 24. Between the drip pan portion 23 and the ash catch portion 24 of the crib covers 20 is situated a peak 25, the significance and function of which will become more apparent later in this description. Along the bottom edge of the ash catch portion 24 of the crib cover 20 are a number of hinge tabs 16. These hinge tabs 16 are used to attach the crib cover 20 to the coal crib base 6. See FIG. 4. In this closed configuration, the top cover portions 22 of the crib covers 20 are latched and the coal crib assembly 10 assumes a streamlined suitcase-like appearance.

In further detail, the coal crib assembly 10 has a pair of crib end plates 3 between which extend a pair of crib rails 4. Below the crib rails 4 and likewise extending between the crib end plates 3 is a metal grid 2. The metal grid 2 is made from a single, lightweight expanded metal piece which is bent to shape and inserted into the end plates 3. The crib rails 4 are configured to prevent any curvature or warp of the metal grid 2 during high heat output. This grid 2 is suspended by the rails 4 and is situated above the crib base 6. It is the crib base 6 which also contains the cutouts 7 which are designed to receive the hinge tabs 16 of the crib cover 11. See FIG. 4. Integral with each end plate 3 is a handle portion 18 which allows the entire unit to be easily transported.

Situated on the outer surface each of the crib end plates 3 is a taper mount 8 which is functionally adapted to receive a mating taper mount 9 situated at the longitudinal middle of the carrier end 40 (see FIG. 3) and of the motor box assembly 42 (not shown). This configuration allows the carrier end 40 and the motor box assembly 42 to be situated safely and securely each time the unit is used. This configuration also facilitates the assembly and disassembly of the unit. It should also be noted that, in the preferred embodiment, the motor box assembly 42 contains a pair of correctly sized, a pre-lubricated gear motors (not shown) which offer a smooth, safe and quiet operation. Furthermore, the drive motors contained within the motor box assembly 42 are configured for opposite rotation. That is, they are configured such that each motor rotates the spit assemblies 44, 46 with an inward turning rotation to allow the meat drippings to naturally roll off the back side of the meat rotation and end up in the drip pan catch portions 23 of the crib covers 20.

The detachable crib covers 20 are also provided with means for providing additional stability to the unit during rotation of the meat. A pair of support rods 33 are situated under the top cover portion 22 of the detachable drip pan 20. See FIGS. 5 and 6. One end of the support rod 33 is secured with a swivel mount 34 which allows the rod to swing out from under the cover portion 22. The other end of the support rod 33 is secured by a clip 36 which is also situated under the top cover portion 22 of the drip pan 20.

Figure 1:
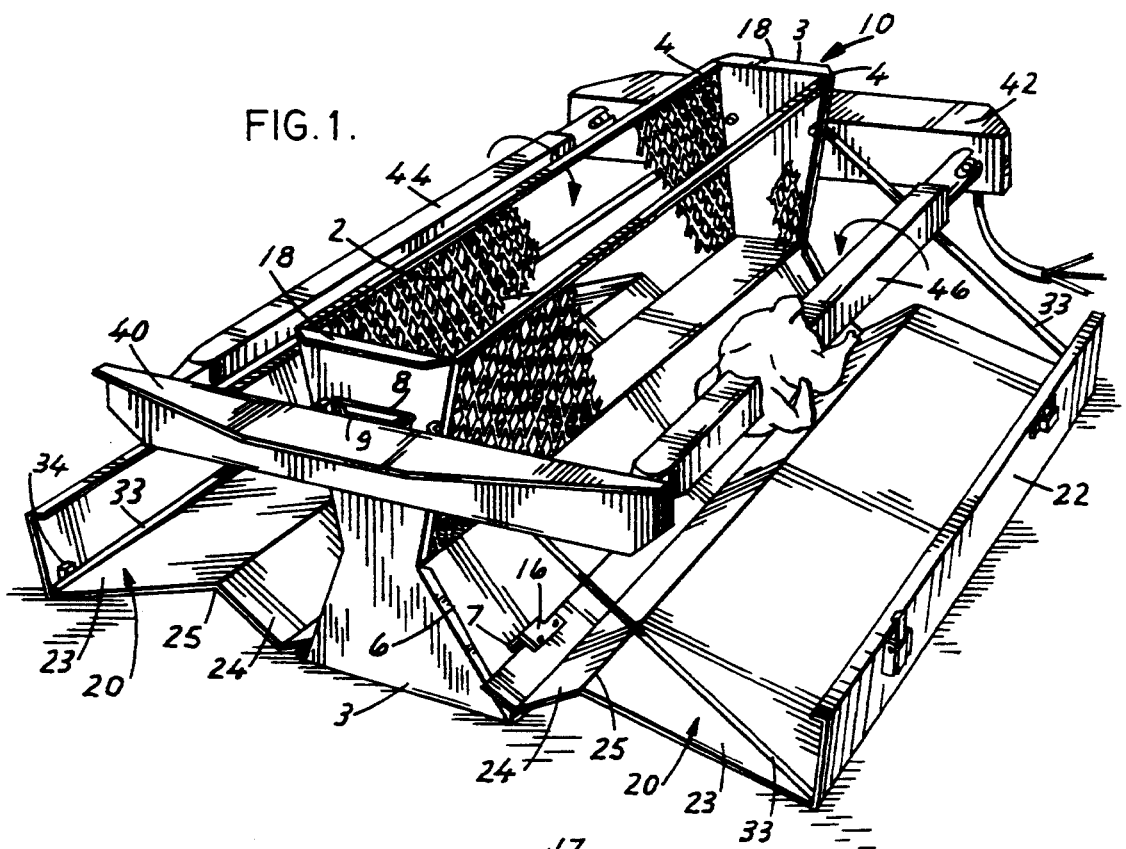
FIG. 1 is a perspective view of the rotisserie cooking unit of the showing the elements of the unit in their fully disassembled, or usable, state.

In application, the unit starts out as a rather compact assembly of elements as shown in FIG. 2. These elements are kept intact and the unit assumes its compactness because the carrier end 40, the motor box assembly 42, and the spit assemblies 44, 46 can be placed within the metal grid 2. The drip pans 21 cover the outer side surfaces of the grid 2 and crib base 6 and are fastened at their respective top cover portions 22 by use of latches 17. Upon disassembly of the elements, the top cover portions 22 are opened up and lowered to the ground as shown in FIG. 1. The support rods 33 are swung out from their secured positions with the distal ends of each rod 33 being placed within an opening designed to receive it within each of the coal crib end plates 3. The carrier end 40 and the motor box assembly 42 are removed from the metal grid 2. The carrier end 40 and the motor box assembly are then engaged by using the taper mounts 8, 9 shown in FIG. 3. This also serves to further secure the distal ends of the support rod 33 within the crib end plate 3 openings and actually prevents them from coming out as long as the carrier end 40 and the motor box assembly 42 are engaged. It is at this point that the coal or other heat source material is added to the grid 2 and ignited so as to start the cooking process. The spit assemblies 44, 46 are engaged with the carrier end supports 41, 42 and with their motor box assembly 42 counterparts (not shown). A very important feature of the device of the present invention becomes evident during this cooking process. And that is something which was alluded to earlier the shape or configuration of the crib covers 20. For ease in explanation, only the features of one of the covers will be described since the other is a symmetrical double for it and serves the same function given the direction of spit rotation previously referred to. The cover 20 has integral to it an ash catch portion 24 and a drip pan portion 23. The ash catch portion 24 and the drip pan portion 23 are separated by a peak 25. With the spit 46 rotating inwardly, the meat drippings run off of the backside of the meat, or onto the drip pan portion 23 of the cover 20. Any ashes which may fall from within the grid 2 are caught by the ash catch portion 24 of the cover 20 and any contact with the drippings is thus prevented. The cooking process in this configuration is almost totally smokeless.

In order to disassemble the unit, the foregoing steps are simply done in reverse. However, an additional step is utilized when preparing to store the elements, which is really a step having to do with clean-up after the cooking process is completed. And this is, after the carrier end 40 and the motor box assembly 44 are removed, to stow away the support rods 33 and to remove the drip pan covers 20 from the crib base 6 and to tip over the crib assembly 10 to remove all residual coal and ashes from the grid 2.

From the foregoing detailed description of the illustrated embodiment of the invention set forth herein, it will be apparent that there has been provided a new, useful and uncomplicated rotisserie cooking unit which has a vertical heat source, which requires only a minimal number of elements and which requires only a minimal number of steps to assemble and to disassemble the cooking unit in the field. A principal feature of this invention is its relatively easy assembly and collapsibility for compact transporting and storage. It is also apparent that such a device has been provided which, once assembled, is easily utilized in the field to uniformly cook meat and which, because of its configuration, insures the uniform cooking of the meat and the like, which is collapsible, which occupies a much smaller area when collapsed than when assembled and which results in the unit having a rather compact suitcase-like appearance when collapsed.

The principles of this invention having been fully explained in connection with the foregoing, I hereby claim as my invention:

1. A rotisserie cooking unit comprising
 a longitudinally extending heat source,
 means for supporting said heat source, said heat source support means including a longitudinally extending base member having a first end and a second end,
 a spit drive assembly, said spit drive assembly being removably mountable upon either the first end or the second end of the heat source support base member,
 a spit carrier assembly, said spit carrier assembly being removably mountable upon either the first end or the second end of the heat source support base member and being opposable to said spit drive assembly, and
 a pair of longitudinally extending cover members, said cover members being identically configured and used to either enclose the heat source and the heat source support base member or be opened up to extend outwardly from the heat source support base, each of said cover members including an ash catch portion and a drip pan portion integral thereto, said ash catch portion and said drip pan portion being separated by a ridge.

2. The cooking unit of claim 1 wherein each of said cover members includes means for stabilizing the cooking unit when the covers are opened and extending outwardly from the heat source base.

3. A rotisserie cooking unit having a heat source for cooking meat fastened to spits placed adjacent the heat source, which comprises means for supporting said heat source, said heat source support means including a longitudinally extending base having a first and a second end member, a spit drive assembly, said spit drive assembly being removably securable to either of the first or second end of the heat source support base member, a spit carrier assembly, said spit carrier assembly being removably securable to either of the first or second end of the heat source support base member and being opposable to said spit drive assembly, and a pair of longitudinally extending cover members, said cover members being identically configured to either enclose the heat source and the heat source support base or to be opened up to extend outwardly from the heat source support base, each of said cover members including an ash catch portion and a drip pan portion integral thereto, said ash catch portion and said drip pan portion being separated by a ridge.

4. The cooking unit of claim 3 wherein each of said cover members includes means for stabilizing the cooking unit when the covers are opened and extending outwardly from the heat source support base.

* * * * *